United States Patent Office 3,072,573
Patented Jan. 8, 1963

3,072,573
STABILIZATION OF ORGANIC COMPOSITIONS WITH METAL DEACTIVATORS
Ronald B. Spacht, Kent, Ohio, assignor to The Goodyear Tire & Rubber Company, Akron, Ohio, a corporation of Ohio
No Drawing. Filed May 13, 1959, Ser. No. 812,804
7 Claims. (Cl. 252—51.5)

The present invention relates to the stabilization of organic compositions with metal deactivators. More particularly, it concerns the stabilization of organic substances against deterioration by oxygen, catalyzed in the presence of or by contact with oxidation-promoting metals and their compounds by the addition of small amounts of new, highly efficient metal deactivators to the organic substances. While the present invention is applicable to the prevention of such deterioration in liquid fuels, lubricants, fats and oils, monomers and resins, it is particularly useful in the stabilization of natural and synthetic rubbers.

Many organic substances, and particularly rubber, unsaturated hydrocarbons, fats and oils, are subject to the hazard of deterioration due to oxidation. The danger of such oxidative deterioration is greatly increased by the accidental inclusion of extraneous metallic materials in the organic compounds, e.g., Cu, Mn or Fe metal or salts. These metallic substances are inherently catalytic to the oxidation of organic materials unless suppressed by the use of specific additives. The suppression of the catalytic effect arising from the presence in organic materials of metals, has previously been achieved through the utilization of so-called metal deactivators, for example, see U.S. Patents 2,442,200; 2,486,538; 2,530,650 and 2,533,205.

A principal object of the present invention is to protect organic materials against the deterioration of the organic material caused by the catalytic effect of metals or metal compounds present in such substances. Further objects include:

(1) Provision of means for the deactivation of the catalytic metals in organic compositions to help retard oxidative deterioration of the compositions.

(2) Provision of means for inhibiting the deterioration of elastomers, such as rubber, in the presence of metallic substances which normally tend to catalyze the deterioration of these compounds through oxidation, and (3) Provision of new compositions comprising an organic compound subject to oxidative deterioration, e.g., natural or synthetic rubber, gasoline, lubricating oils or greases, and fuel oils, contaminated with an oxidation catalyzing metal or metal compound and a new, high effective deactivator for the metal or metal compound.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

These objects are achieved in accordance with the present invention by the addition of o-hydroxy arylamides of o-hydroxy aryl carboxylic acids to organic compositions to act as metal deactivators in the compositions. It has been found that the addition of these arylamides deactivates or suppresses the effects of the metal components of the compositions in catalytically increasing oxidative deterioration of the organic compositions.

Normally, the organic composition thus protected against the metallic catalyzed oxidative deterioration will also include an anti-oxidant devoted to retarding oxidation naturally occurring, regardless of the presence of metal catalysts. However, the efficiency and overall results of such antioxidants is seriously retarded by the catalytic activity of the metals. In view of this fact, the compounds of the present invention are devoted to the deactiviation of the metal catalysts, while the simultaneous suppression of auto-oxidation caused by autogenous catalysts may be achieved through the use of anti-oxidants.

The preferred arylamides of aryl carboxylic acids utilized in the present invention have the structure:

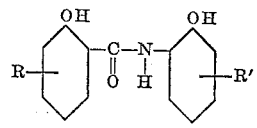

wherein R and R' represent hydrogen, alkyl, alkoxy or halogen and may be the same or different. Among the compounds of the invention 2,2'-dihydroxy benzanilide has been found to be particularly effective for the achievement of the objects of the invention.

Other arylamides within the scope of the invention are dihydroxy-dialkyl-benzanilides such as 2,2'-dihydroxy-3,3'-dimethyl benzanilide; 2,2'-dihydroxy-3,3'-diethyl benzanilide; 2,2'-dihydroxy-4,4'-dimethyl benzanalide; 2,2'-dihydroxy-5,5'-di-isopropyl benzanilide; 2,2'-dihydroxy-4-methyl-6'-amyl benzanilide; 2,2'-dihydroxy-5,5'-diethyl benzanilide; 2,2'-hydroxy-6,6'-dimethyl-benzanilide; 2,2'-dihydroxy-4 ethyl-6'-amyl benzanilide; 2,2'-dihydroxy-4-isopropyl-6'-butyl benzanilide; 2,2'-dihydroxy-3-methyl-4'-methyl benzanilide; 2,2'-dihydroxy-4-ethyl-6'-methyl benzanilide, and equivalent compounds, particularly wherein the alkyl substituents are alkyl radicals of one to six carbon atoms.

Also useful as metal deactivators in accordance with the invention are dialkoxy substituted 2,2'-dihydroxy benzanilide such as 2,2'-dihydroxy-3,3'-dimethoxy benzanilide; 2,2'-dihydroxy-3,3'-diethoxy-benzanilide; 2,2'-dihydroxy-4,4'-diethoxy benzanilide; 2,2'-dihydroxy-4-propoxy-6'-butoxy benzanilide; 2,2'-dihydroxy-5,5'-diethoxy-benzanilide; 2,2'-dihydroxy-6,6' dimethoxy benzanilide; 2,2'-dihydroxy-4-methoxy-6'-butoxy benzanilide; 2,2'-dihydroxy-3-mehoxy-5'-methoxy benzanilide; 2,2'-dihydroxy-4-ethoxy-6'-methoxy-benzanilide and similar compounds which are di-substituted with the same or different alkoxy radicals, particularly with alkoxy radicals containing from one to six carbon atoms.

Also useful as metal deactivators in organic compositions are dihalo 2,2'-dihydroxy benzanilides, such as 2,2'-dihydroxy-3,3'-dibromo benzanilide; 2,2'-dihydroxy-4,4'-dichloro-benzanilide; 2,2'-dihydroxy-5,5'-difluoro-benzanilide; 2,2'-dihydroxy-6,6'-diiodobenzanilide; 2,2'-dihydroxy-3-chloro-5'-chloro benzanilide; 2,2'-dihydroxy-3-bromo-3'-chloro benzanilide; 2,2'-dihydroxy-4-fluoro-6'-iodo benzanilide and equivalent dihalo compounds.

In addition to the foregoing compounds wherein the mono-substituent of each benzene ring is selected from the same general group of atoms or radicals, i.e., hydrogen, alkyl, alkoxy or halogen, compounds in which each benzene ring is substituted with radicals or atoms selected from different groups may also be utilized. Mixed compounds typical of the group are alkyl-alkoxy, alkyl-halo and alkoxy-halo 2,2'-dihydroxy benzanilides wherein the mixed substituents are located either symmetrically or asymmetrically at the 3,4,5 or 6 positions of the two benzene rings. Examples of these and other compounds useful in this invention as metal deactivators are disclosed in my copending application Serial No. 811,555, filed May 7, 1959, now abandoned.

The compounds utilized in the method of the present invention may be prepared by the reaction of o-aminophenol and phenyl salicylate or the mono-alkyl, alkoxy or halo substituted forms of these compounds as is more fully described in my aforesaid application.

EXAMPLES

A more complete understanding of the novel compositions of matter and their method of production may be had by reference to the following examples in which all parts or percentages are by weight unless otherwise specified.

Example 1

2,2' dihydroxy benzanilide is tested for antioxidant properties in the following formulation.

| | Parts |
|---|---|
| Extracted pale crepe | 100 |
| ZnO | 5 |
| Sulfur | 3 |
| Hexamethylenetetramine | 1 |
| Stearic acid | 1.5 |
| Antioxidant | 1 |

Antioxidant efficiency is measured by aging 6, 12 and 18 days in an oxygen bomb at 50° C. and 150 lbs. pressure. Percent tensile retention and weight increase are used as measures of efficiency. The following data are obtained:

| | Results 18 Days, Percent Tensile Retention | Oxygen Bomb Aging, Percent Weight Increase |
|---|---|---|
| 2,2' dihydroxybenzanilide | 0 | 11.1 |
| No antioxidant | 0 | 18.0 |
| Styrenated phenol antioxidant | 50.0 | 1.11 |

These data show that 2,2'-dihydroxy benzanilide has very little antioxidant activity.

Example 2

A solution is formed by dissolving 400 parts of butadiene-styrene rubber (SBR 1006) in 4000 parts of benzene and then further dissolving therein the following ingredients:

| | Parts |
|---|---|
| Styrenated phenol rubber antioxidant ("Wing-Stay S" sold by Goodyear Tire & Rubber Co.) | 5 |
| Ferric stearate | 0.012 |

The resulting solution is divided into four equal portions and one of these is poured onto and allowed to flow out on a sheet of aluminum foil. The benzene is then evaporated at room temperature from the thin film of solution forming a thin layer of unvulcanized rubber composition. This thin layer is next stripped from the aluminum foil and several small rectangular samples are cut from the stripped film. After being weighed, the samples are placed in an oxygen absorption apparatus and tested for oxygen absorption at 90° C. in accordance with the standardized test reported at "Industrial and Engineering Chemistry," vol. 38, p. 71 (1946).

Example 3

There is dissolved in the second of the four equal portions of rubber solution of Example 2, 1.0 part of 2,2'-dihydroxy benzanilide. Rectangular samples of rubber film from the resulting solution are prepared and tested for oxygen absorption following the procedure of Example 1.

Example 4

The operations of Example 3 are repeated using 2.0 parts of disalicylal propylene diamine (a commercially available metal deactivator) in place of the benzanilide derivative and the third of the four solution portions.

Example 5

The operations of Example 3 are repeated with the last of the solution portions and 1.0 part of mercaptobenzimidazole (a commercially available metal deactivator) in place of the benzanilide derivative.

The average oxygen absorption values of the samples prepared and tested in each of the Examples 2 to 5 are reported in the following table:

TABLE I

| Product of Example | Hours to 2% oxygen | Percent Improvement |
|---|---|---|
| 2 | 14 | |
| 3 | 218 | 1,457 |
| 4 | 32 | 129 |
| 5 | 22 | 57 |

Example 6

A solution is formed by dissolving 300 parts of styrene-butadiene rubber (SBR 1500) containing 2.5% of phenyl-β-naphthylamine as an anti-oxidant are dissolved in 3000 parts of benzene. Then 0.09 part of ferric stearate is dissolved in the solution and it is divided into three equal portions.

A thin film of the first of the three portions is prepared as explained in Example 1 and rectangular samples cut therefrom are subjected at 100° C. to oxygen absorption tests as indicated.

Example 7

There is dissolved in the second portion of the rubber solution of Example 6, 0.5 part of 2,2'-dihydroxy benzanilide and rectangular samples of rubber film are prepared and tested for oxygen absorption as in Example 5.

Example 8

The operations of Example 7 are repeated using the third portion of solution from Example 5 and 0.5 part of mercaptobenzimidazole in place of the benzanilide derivative.

The average oxygen absorption values of the samples prepared and tested in each of Examples 6 to 8 are reported in the following table:

TABLE II

| Product of Example | Hours to 2% oxygen | Percent Improvement |
|---|---|---|
| 6 | 71 | |
| 7 | 164 | 131 |
| 8 | 106 | 49 |

Example 9

A sample of a Pennsylvania thermally cracked gasoline is subjected to a standard oxygen bomb stability test (S.A.E.J. 24, 584, 1929) and the results are reported in accordance to the test as the induction period in minutes, namely, 100 minutes.

To another sample of the same gasoline, there is added 0.01% of a gum inhibitor comprising a major portion of an aminophenol and a minor portion of a phenylene diamine. This inhibited gasoline is then subjected to the same stability test and found to have an induction period of 580 minutes. With 2 p.p.m. of copper added to the inhibited gasoline, the induction period is found to be 170 minutes.

There is also added to a sample of the inhibited gasoline containing 2 p.p.m. of copper, 0.0005% 2,2'-dihydroxy benzanilide and this gasoline mixture is found to have an induction period of 450 minutes.

In the above examples, the usefulness of the new metal deactivators of this invention in stabilizing synthetic rubber of the butadiene-styrene type has been shown. These new metal deactivators are also useful in stabilizing all other types of elastomers, including butyl rubber, natural rubbers, polychloroprene, acrylonitrile-butadiene elastomers, acrylic ester elastomers, vinyl ester elastomers and comparable polymeric materials whose oxidative deterioration is accelerated by presence therein of heavy metals or their compounds, particularly Cu, Co, Mn or Fe.

In addition to stabilization of rubbers as above indicated, the new metal deactivators appear to be useful in stabilizing all other forms of organic substances which are subjects to metal accelerated oxidative deterioration. In addition to cracked gasoline as above reported, they may be used with hydrocarbon lubricants, vegetable and animal fats and oils, proteins, plasticizers or the like. The deactivators function in solutions or the organic substances as well as in undiluted mixtures.

The new metal deactivators may be incorporated in the organic substances in any suitable manner. The amount needed is very small and will depend to some extent upon the material being stabilized and the amount of contaminating heavy metal compound in the material. With natural and synthetic rubber, the deactivator will be used in about 0.05 to 5 parts per 100 parts of rubber. With gasoline, 5 to 50 p.p.m. are effective. Simple tests will indicate the effective amount to be used in stabilization of any organic composition in question. Generally ten times the weight of deactivator is used per unit weight of contaminating metal in the organic substance to be stabilized.

Normally, the new metal deactivators will be used in conjunction with small amounts of other stabilizing or preserving agents, e.g., antioxidants, inhibitors or the like. The above examples illustrate this with use of antioxidants in rubber compositions and gun inhibitors in gasoline mixtures. Typical augmenting materials include hindered phenols, both monohydric and polyhydric, e.g., dibutyl cresol, bisphenols, butylated octyl phenols; diphenyl amines, e.g., p-isopropoxy diphenylamine; octylated diphenylamines; polyalkyl polyphenols; monoethers of hydroquinone, e.g., hydroquinone monobenzyl ether; p-phenylene diamines, e.g., diphenyl p-phenylene diamine, di-β-naphthyl-p-phenylene diamine; alkylated phenols; naphthylamines, e.g., phenyl-β-naphthylamine, aldol-α-naphthylamine; alkyl or aryl phosphites, e.g., tri-(p-nonyl phenyl) phosphite, and similar antioxidants, gum inhibitors or the like well known to the art. Furthermore, the new metal deactivators may be used in combination, if desired, with any other known metal deactivators, such as those disclosed in the aforementioned U.S. patents. Usually, the supplemental agents will be employed in an amount between 0.0001 and 10 parts per 100 parts of organic substance to be stabilized, e.g., in rubber compositions between about 0.5 and 5% by weight of antioxidant will be used with 0.05 to 5% of the metal deactivator.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. An organic material which is subject to oxidative deterioration in the presence of a metal-containing material which catalyzes said deterioration selected from the group consisting of elastomers, gasoline, lubricating oils, fuel oils, and greases, containing a small amount sufficient to stabilize said organic material of a metal deactivator having the structure:

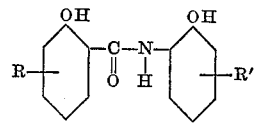

wherein R and R' are radicals selected from the group consisting of hydrogen, one to six carbon alkyl, one to six carbon alkoxy and halogen.

2. Rubber containing a metal salt which catalyzes oxidative deterioration of said rubber and as a metal deactivator to inhibit the catalytic deterioration effect of said metal salt between about 0.05 to 5 percent by weight based upon the rubber of a metal deactivator having the structure:

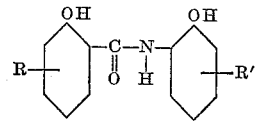

wherein R and R' are radicals selected from the group consisting of $C_1$ to $C_6$ alkyl, $C_1$ to $C_6$ alkoxy, hydrogen and halogen.

3. Rubber containing between about 0.05 and 5 percent by weight of 2,2'-dihydroxy benzanilide.

4. Rubber containing a metal deactivating amount of 2,2'-dihydroxy benzanilide, and an antioxidant amount of an antioxidant.

5. An unvulcanized rubber containing a metal deactivating amount of 2,2'-dihydroxy benzanilide and an antioxidant amount of an antioxidant.

6. As a liquid fuel composition a mixture of liquid hydrocarbons subject to oxidative deterioration containing a metal deactivating amount of a compound having the structure defined in claim 1.

7. A mineral oil subject to oxidative deterioration containing a metal deactivating amount of a compound having the structure defined in claim 1.

References Cited in the file of this patent

UNITED STATES PATENTS

| | | |
|---|---|---|
| 2,486,538 | Thompson | Nov. 1, 1949 |
| 2,654,722 | Young | Oct. 6, 1953 |
| 2,730,500 | Young et al. | Jan. 10, 1956 |
| 2,764,614 | Meyer | Sept. 25, 1956 |
| 2,848,335 | Bell et al. | Aug. 19, 1958 |
| 2,879,823 | Smith | Mar. 31, 1959 |
| 2,964,494 | Lappin et al. | Dec. 13, 1960 |
| 2,967,194 | Hauptschein | Jan. 3, 1961 |